United States Patent
Han

(10) Patent No.: US 7,301,456 B2
(45) Date of Patent: Nov. 27, 2007

(54) WIRELESS TERMINAL-INTEROPERABLE HOME NETWORK SYSTEM AND METHOD CONTROLLING THE SAME

(75) Inventor: Sun Mi Han, Seoul (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 10/917,292

(22) Filed: Aug. 13, 2004

(65) Prior Publication Data

US 2005/0184865 A1 Aug. 25, 2005

(30) Foreign Application Priority Data

Feb. 25, 2004 (KR) ...................... 10-2004-0012576

(51) Int. Cl.
*G08B 13/00* (2006.01)
*H04N 7/18* (2006.01)

(52) U.S. Cl. ................. 340/541; 340/539.25; 340/565; 348/143; 348/152

(58) Field of Classification Search ................ 340/541, 340/539.25, 565, 567, 531, 506, 286.02, 340/286.06; 348/143, 152, 153, 154, 155, 348/211.99, 211.3, 211.8, 211.11
See application file for complete search history.

(56) References Cited

U.S. PATENT DOCUMENTS

| | | | |
|---|---|---|---|
| 5,576,972 A * | 11/1996 | Harrison ...................... 702/128 |
| 6,400,265 B1 * | 6/2002 | Saylor et al. ................ 340/531 |
| 6,504,479 B1 * | 1/2003 | Lemons et al. ............. 340/541 |
| 6,747,554 B1 * | 6/2004 | Higashimura et al. ....... 340/506 |
| 6,798,344 B2 * | 9/2004 | Faulkner et al. ............ 340/541 |
| 6,977,585 B2 * | 12/2005 | Falk et al. .................. 340/506 |
| 2004/0004542 A1 | 1/2004 | Faulkner et al. ............ 340/506 |
| 2004/0021778 A1 * | 2/2004 | Oldani et al. .......... 348/211.99 |

FOREIGN PATENT DOCUMENTS

| CN | 1264254 | 8/2000 |
|---|---|---|
| CN | 1438805 | 8/2003 |

OTHER PUBLICATIONS

English Language abstract of CN 1438805. Aug. 27, 2003.
English Language abstract of EP 1022905. Aug. 23, 2000.

* cited by examiner

*Primary Examiner*—Toan N. Pham
(74) *Attorney, Agent, or Firm*—Greenblum & Bernstein, P.L.C.

(57) ABSTRACT

Disclosed herein are a wireless terminal-interoperable home network system and a method for controlling the same. A home server is linked with a security device and camera installed in a building to, when the security device senses entrance/exit of an outsider into/from the building, acquire an internal image of the building from the camera and send the acquired image to a wireless terminal of a user to enable the user to monitor the internal situation of the building in real time. The user can access the home server over a wireless communication network from a remote place outside of the building without separate access to the Internet to receive the internal image of the building and check the internal situation of the building on the basis of the received internal image, resulting in an increase in convenience of use.

10 Claims, 4 Drawing Sheets

WIRELESS TERMINAL-INTEROPERABLE HOME NETWORK SYSTEM AND METHOD CONTROLLING THE SAME

BACKGROUND OF THE INVENTION

1. Field of the Invention

The present invention relates to a wireless terminal-interoperable home network system and a method for controlling the same, and more particularly to such a system and method wherein a home server is linked with a security system installed in a building to, when the security system senses entrance/exit of an outsider into/from the building, acquire an internal image of the building from the security system and send the acquired image to a wireless terminal of a user to enable the user to monitor the internal situation of the building in real time, and the user can wirelessly access the home server from anywhere outside of the building to receive an internal image of the building so as to check the state of his/her child or pet in the building.

2. Description of the Related Art

Conventional home network systems will hereinafter be described with reference to FIGS. 1a and 1b.

FIG. 1a shows the configuration of a conventional home network system based on the Internet. In this home network system, a plurality of home appliances C1-C4 used in a home are interconnected over one internal network N, which is in turn connected with an external Internet network I, thereby enabling a user to control the home appliances C1-C4 from anywhere inside or outside of the home.

As shown in FIG. 1a, a home appliance HS, which functions as a home server, is further connected to the network N to centrally control the other home appliances C1-C4 networked therewith.

In addition, when the user is away from the home, he/she can access the home appliance HS functioning as the home server through a remote device RC connectable with the external Internet network I, such as a personal computer (PC), to monitor the states of the home appliances C1-C4 in the home and input control commands to the home appliances C1-C4.

However, since this home network system is realized on the premise that the external Internet network I, such as a very high speed Internet network, must be constructed, it has the limitation of being unable to be directly applied to places where the spread of the Internet is low.

In order to overcome the above problem, there has recently been developed a home network system wherein a user can remotely control a plurality of home appliances C5-C7 using a public switched telephone network (PSTN) TN, as shown in FIG. 1b.

In this home network system, control commands inputted by the user are sent to a home appliance HS1, which functions as a home server, over the PSTN TN so as to control the home appliances C5-C7.

In the second home network system, however, remote control means is limited to a telephone 10 and control commands are distinguished from one another by only the order of manipulations of numeric buttons on the telephone, resulting in a limitation in home appliance operation control range, thereby making it impossible to input detailed operation control commands.

On the other hand, a security system has recently been spread which generates an alarm upon sensing entrance/exit of an outsider into/from a building. However, since the above-mentioned conventional home network systems are not interoperable with the security system, it is impossible to control the security system using the home appliances HS and HS1 functioning as the home servers, which leads to inconvenience of use.

In addition, when the security system senses entrance/exit of an outsider into/from the home under the condition that the user is away from the home, it cannot automatically notify the remote user of such a situation, so the user cannot efficiently cope therewith.

Furthermore, where the security system captures an internal image of the building through a camera included therein, the user has to check the captured image using a separate reproduction device, so he/she is unable to check the internal situation of the building under the condition of being away from the home.

SUMMARY OF THE INVENTION

Therefore, the present invention has been made in view of the above problems, and it is an object of the present invention to provide a wireless terminal-interoperable home network system and a method for controlling the same, wherein a home server is linked with a security device and camera installed in a building to, when the security device senses entrance/exit of an outsider into/from the building, acquire an internal image of the building from the camera and automatically send the acquired image to a wireless terminal of a user to enable the user to monitor the internal situation of the building in real time from a remote place outside of the building.

It is another object of the present invention to provide a wireless terminal-interoperable home network system and a method for controlling the same, wherein a user can access a home server using a wireless terminal from anywhere outside of a building to receive an internal image of the building so as to check the state of his/her child or pet in the building.

In accordance with the present invention, the above and other objects can be accomplished by the provision of a wireless terminal-interoperable home network system comprising: a wireless terminal connected to a wireless communication network for transmitting/receiving a control message/image data over the wireless communication network; a security device installed in a building for sensing entrance/exit of an outsider into/from the building; a camera for capturing an internal image of the building; and a home server connected with the security device and camera via an internal network of the building for controlling operations of the security device and camera, the home server transmitting/receiving the image data/control message to/from the wireless terminal over the wireless communication network.

Preferably, the wireless terminal sends a control message for control of the operation of at least one home appliance, the security device or camera to the home server over the wireless communication network to remotely control the home appliance, security device or camera.

If the security device senses entrance/exit of an outsider into/from the building by checking an indoor thermal variation of the building, then it sends an alarm signal to the home server.

Upon receiving the alarm signal sent from the security device, the home server drives the camera to acquire an internal image of the building, and transmits the acquired image to the wireless terminal.

The wireless terminal reproduces the image transmitted from the home server. As a result, the user can take speedy and appropriate measures to cope with the intrusion of the outsider, by monitoring the internal situation of the building in real time from a remote place outside of the building.

The home server controls the operation of at least one home appliance connected to the internal network, as well as driving the camera in response to the alarm signal from the security device.

The home server further generates a control command for control of the operation of the home appliance, security device or camera in response to a home appliance, security device or camera control message from the wireless terminal.

Therefore, the user can control the operations of the home appliance, security device and camera through the wireless terminal from the remote place, resulting in an increase in control efficiency of the home network system. Further, the user can check the state of his/her child or pet left alone in the home through the wireless terminal from the remote place, causing an increase in convenience of use.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of a wireless terminal-interoperable home network system and a method for controlling the same according to the present invention will be described in detail with reference to the annexed drawings. Although various embodiments of the present invention may be realized, only the most preferred ones thereof will hereinafter be described. Here, the basic structure of the home network system is similar to that of the above-mentioned conventional system and a detailed description thereof will thus be omitted.

Figure 1A:
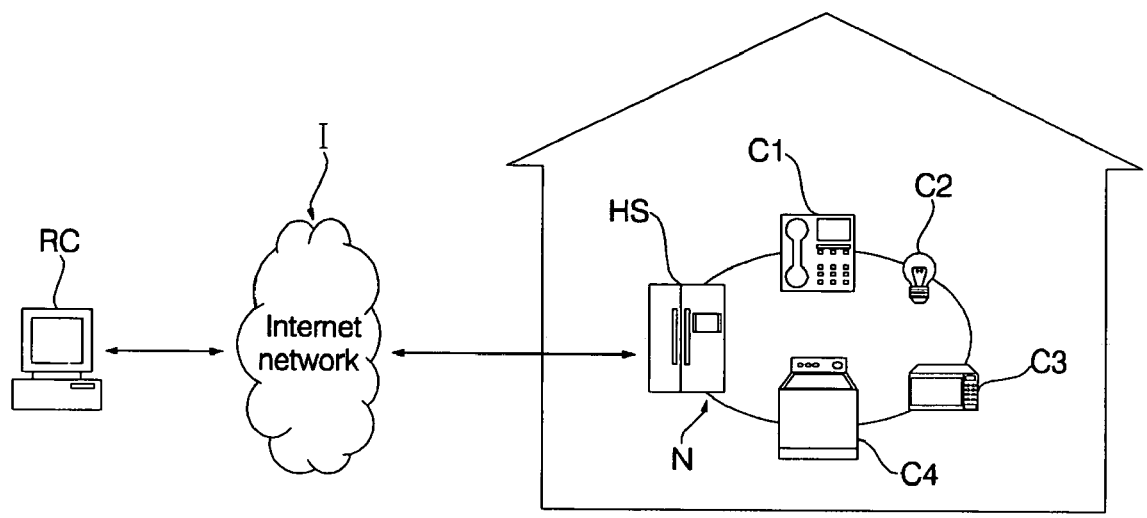
FIG. 1a is a view showing the configuration of a conventional home network system based on the Internet.
Figure 1B:
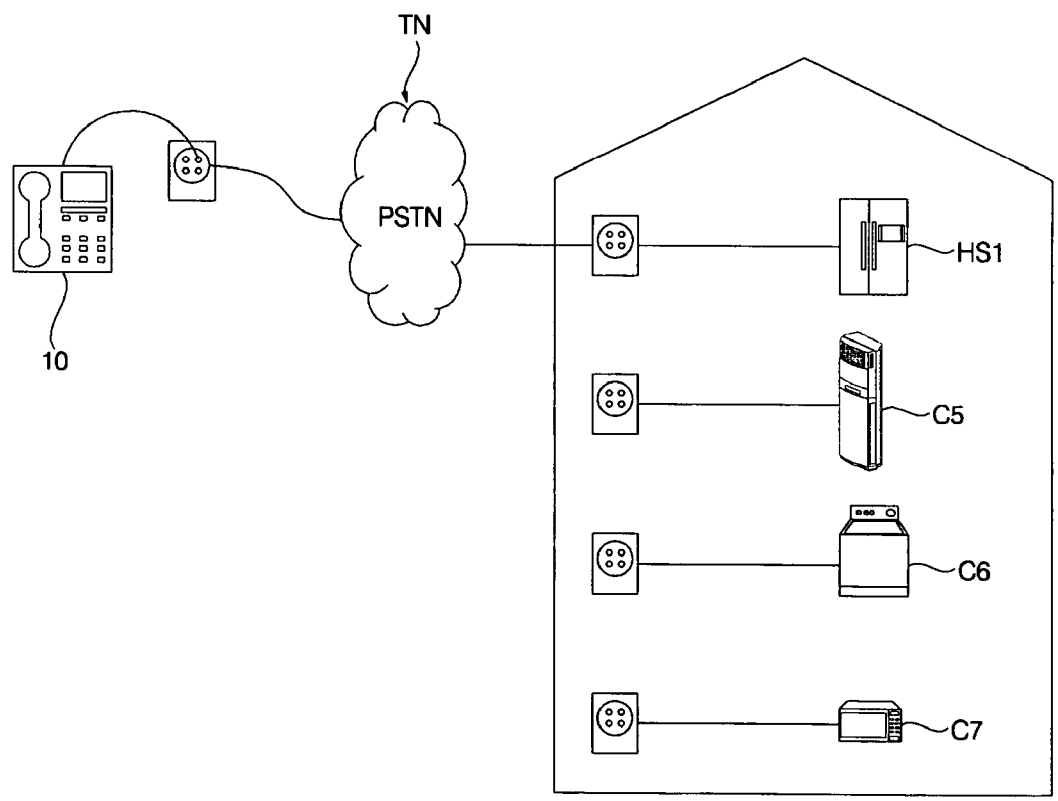
FIG. 1b is a view showing the configuration of a conventional home network system based on a PSTN.
Figure 2:
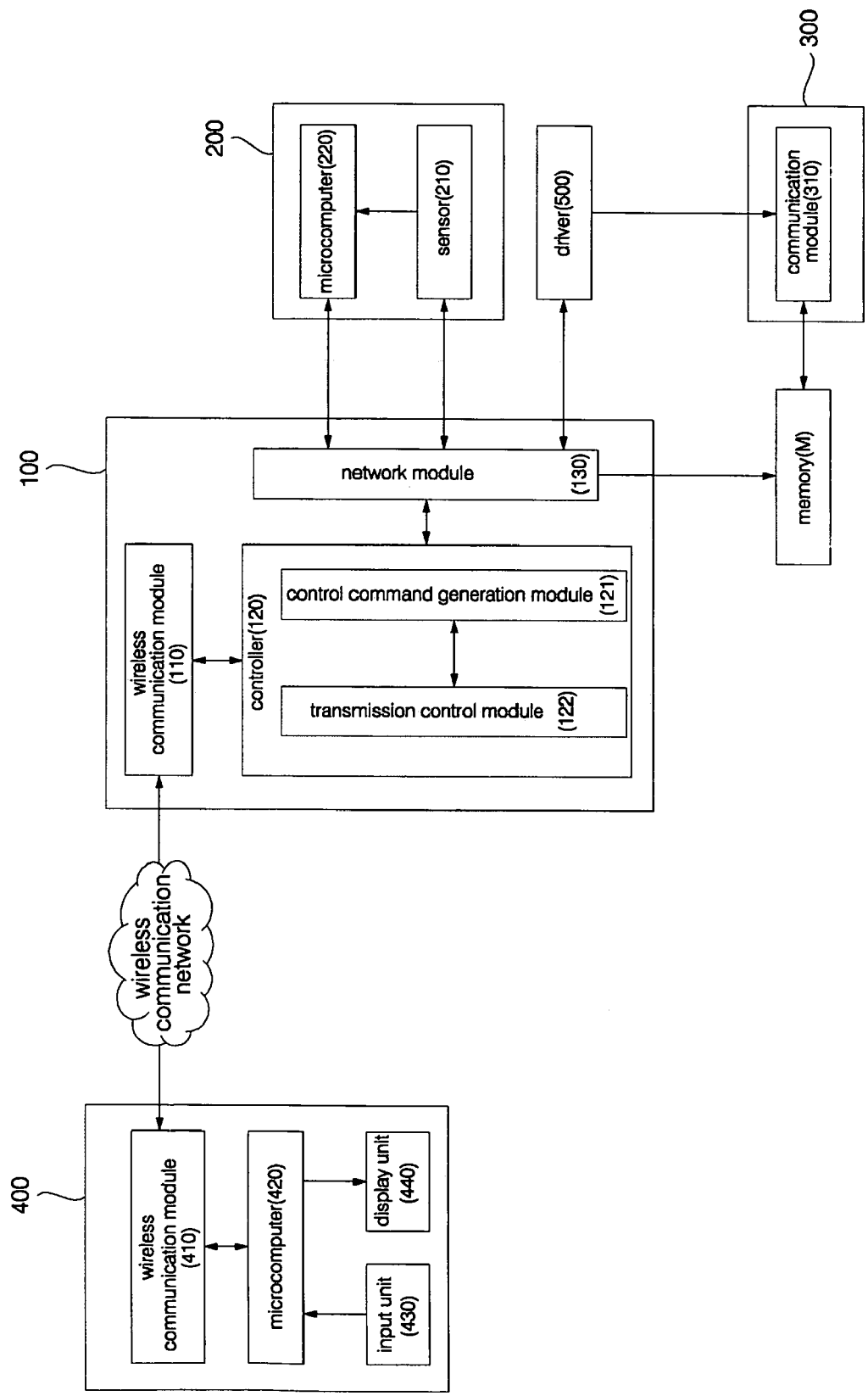
FIG. 2 is a block diagram showing the configuration of a wireless terminal-interoperable home network system according to the present invention.

FIG. 2 is a block diagram schematically showing the configuration of a wireless terminal-interoperable home network system according to the present invention.

As shown in FIG. 2, the wireless terminal-interoperable home network system according to the present invention comprises a wireless terminal 400 connected to a wireless communication network for transmitting/receiving a control message/image data over the wireless communication network, a security device 200 installed in a building for sensing entrance/exit of an outsider into/from the building, a camera 300 for capturing an internal image of the building, and a home server 100 connected with the security device 200 and camera 300 via an internal network of the building for controlling the operations of the security device 200 and camera 300. The home server 100 is also adapted to transmit/receive the image data/control message to/from the wireless terminal 400 over the wireless communication network.

The security device 200 includes a sensor 210 for checking an indoor thermal variation of the building for sense entrance/exit of an outsider into/from the building, a microcomputer 220 for generating an alarm signal if the sensor 210 senses the entrance/exit of the outsider, and a communication module (not shown) for transmitting the alarm signal from the microcomputer 220 to the home server 100, receiving a control command from the home server 100 and transferring the received control command to the microcomputer 220.

The sensor 210 is preferably implemented with an infrared sensor that checks a positional variation of an indoor heat source using infrared rays to sense movement of a person.

If the sensor 210 senses movement of a person, the microcomputer 220 generates the alarm signal and sends it to the home server 100 through the communication module.

Upon receiving the alarm signal sent from the security device 200, the home server 100 drives the camera 300 to acquire an internal image of the building, and transmits the acquired image to the wireless terminal 400.

To this end, the home server 100 includes a wireless communication module 110 for performing wireless communication with the wireless terminal 400 over the wireless communication network, and a controller 120 for generating a control command for control of the operation of the security device 200 or camera 300 in response to the control message transmitted from the wireless terminal 400 and transmitting the alarm signal sent from the security device 200 and the image captured by the camera 300 to the wireless terminal 400 through the wireless communication module 110.

The controller 120 includes a control command generation module 121 for generating the control command for control of the operation of the security device 200 or camera 300 in response to the control message transmitted from the wireless terminal 400, and a transmission control module 122 for performing a data conversion process for the alarm signal sent from the security device 200 or the image captured by the camera 300 so that it can be transmitted to the wireless terminal 400.

The home server 100 further includes a network module 130 for transmitting and receiving data to/from home appliances, the security device 200 and the camera 300 connected to the internal network.

The network module 130 is preferably implemented with a wireless modem that transmits and receives data in a radio frequency (RF) communication manner, or a power line modem that transmits and receives data in a power line communication manner, according to the type of the internal network used in the home network system.

Upon receiving the alarm signal from the security device 200 through the network module 130, the control command generation module 121 generates a control command to drive the camera 300.

In response to the control command from the home server 100, the camera 300 captures an internal image of the building and sends the captured image to the home server 100.

To this end, the camera 300 includes a communication module 310 for transmitting image data to the home server 100 and receiving the control command therefrom.

A driver 500 is coupled with the camera 300 to pan the camera 300 or perform a zoom-in function for near capture or a zoom-out function for far capture of the camera 300.

The transmission control module 122 of the home server 100 performs a data conversion process for the alarm signal sent from the security device 200 or the internal image of the building captured by the camera 300 so that it can be transmitted to the wireless terminal 400.

The alarm signal or image, subjected to the data conversion process by the transmission control module 122, is sent to the wireless terminal 400 through the wireless communication module 110.

The camera 300 or home server 100 may further include a memory M for storing the captured image.

Where the memory M is provided in the home network system, the camera 300 captures an internal image of the building and stores it in the memory M, and the transmission control module 122 acquires the internal image of the building stored in the memory M and transmits it to the wireless terminal 400.

The wireless terminal 400 includes a wireless communication module 410 connected to the wireless communication network for transmitting and receiving data over the wireless communication network, an input unit 430 for inputting a control command for control of the operation of the security device 200 or camera 300, a display unit 440 for displaying the image captured by the camera 300, and a microcomputer 420 for transmitting a control message based on the control command inputted by the input unit 430 to the home server 100 through the wireless communication module 410 and receiving the image data from the home server 100 through the wireless communication module 410.

The display unit 440 of the wireless terminal 400 displays the image data from the home server 100, received through the wireless communication module 410.

At this time, a remote user may input, through the input unit 430, a zoom-in command to view the inside of the building more minutely or a zoom-out command to view the inside of the building fully.

The remote user may also input, through the input unit 430, a pan command to pan the camera 300. The microcomputer 420 generates a control message based on such a control command and sends the generated control message to the home server 100 through the wireless communication module 410.

The control command generation module 121 of the home server 100 generates a control command to control the operation of the camera 300 in response to the control message from the wireless terminal 400, received through the wireless communication module 110.

In response to the control command from the home server 100, the driver 500 pans the camera 300 or performs the zoom function thereof to capture an image desired by the user.

If the remote user inputs, through the input unit 430 of the wireless terminal 400, an image data output command to check the state of his/her child or pet in the building, the microcomputer 420 generates a control message based on the inputted image data output command to drive the camera 300 and sends the generated control message to the home server 100 through the wireless communication module 410.

In response to the control message from the wireless terminal 400, received through the wireless communication module 110, the controller 120 of the home server 100 generates a control command to drive the camera 300, and sends the generated control command to the camera 300.

In response to the control command sent from the controller 120, the driver 500 drives the camera 300 to acquire an image desired by the user, and the home server 100 sends the acquired image to the wireless terminal 400.

Accordingly, the home server 100, the security device 200 and the camera 300, which have conventionally been managed in a separate manner, are managed in an integrated manner, thereby making it possible to reduce the user's inconvenience of separately controlling the home server 100, the security device 200 and the camera 300.

In addition, when an outsider intrudes into the building, the remote user can take speedy and appropriate measures to cope with the intrusion of the outsider, by monitoring the internal situation of the building in real time from a remote place outside of the building on the basis of image data sent from the home server 100.

Furthermore, where a child or pet is left alone in the home, the user can conduct safety supervision of the child or pet by readily checking the internal image of the building from the remote place whenever necessary.

Figure 3:
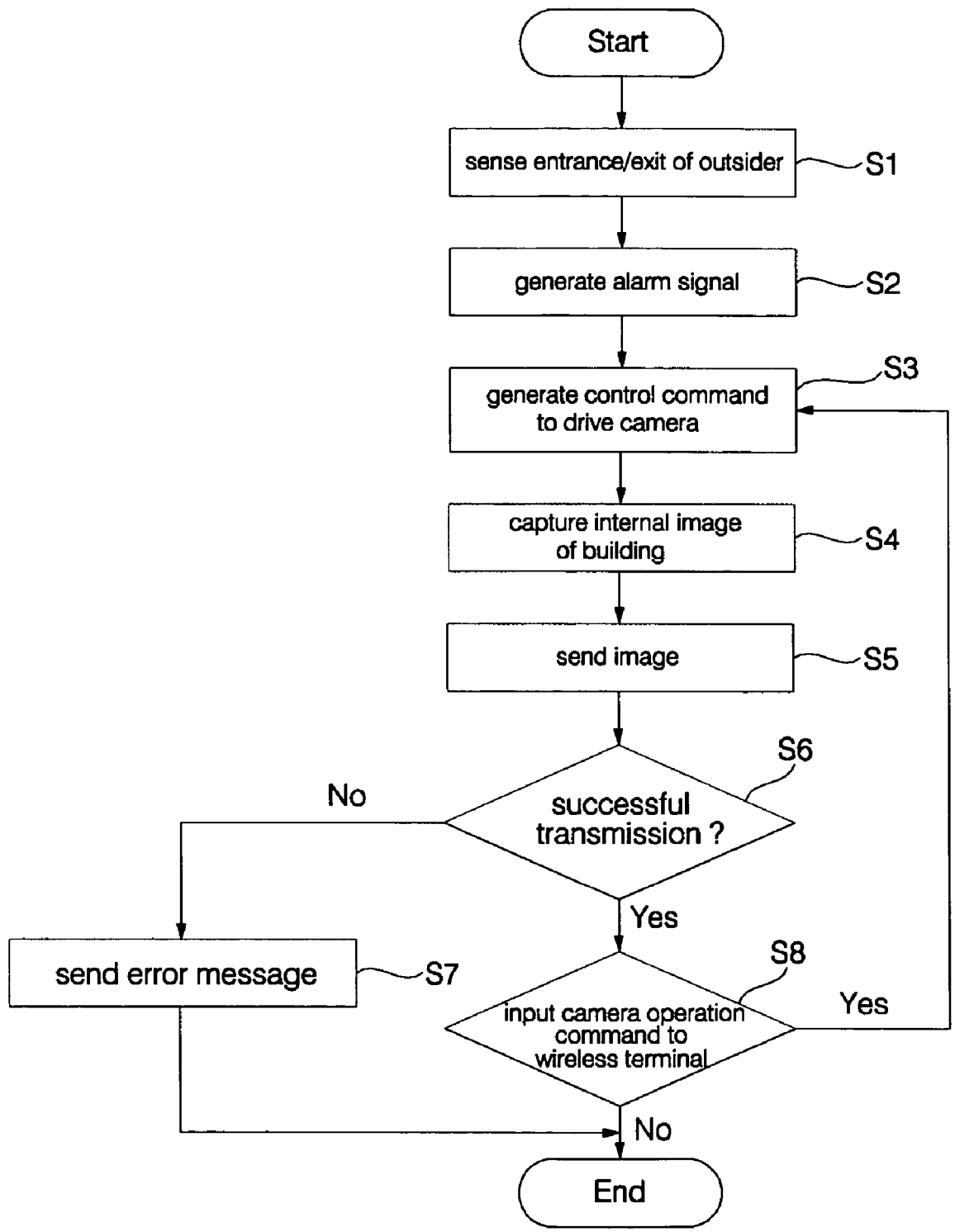
FIG. 3 is a flow chart illustrating a first embodiment of a method for controlling the wireless terminal-interoperable home network system according to the present invention.
Figure 4:
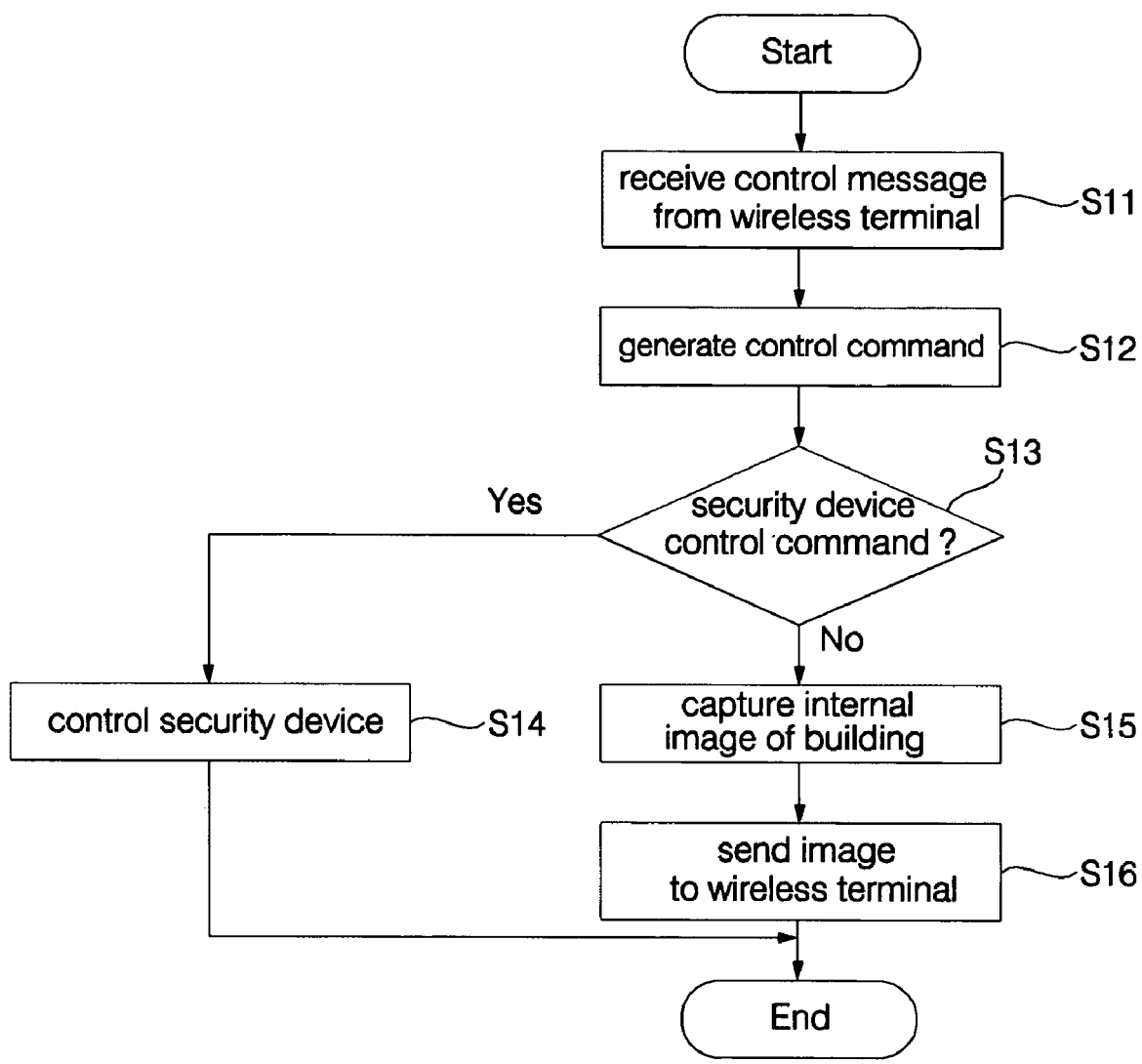
FIG. 4 is a flow chart illustrating a second embodiment of the method for controlling the wireless terminal-interoperable home network system according to the present invention.

The operation of the home network system with the above-stated configuration according to the present invention will hereinafter be described in detail with reference to FIGS. 3 and 4.

First, a description will be given of the operation of the home network system of the present invention in the case where entrance/exit of an outsider into/from the building is sensed by the security device, with reference to FIG. 3.

If the security device senses entrance/exit of an outsider into/from the building (S1), then it generates an alarm signal and sends it to the home server (S2).

Upon receiving the alarm signal sent from the security device, the home server generates a control command to drive the camera (S3). Then, the camera captures an internal image of the building in response to the control command from the home server (S4).

The home server sends the internal image of the building captured by the camera to the wireless terminal (S5) so that the user can view the internal image from a remote place outside of the building.

At this time, if the home server fails to send the image to the wireless terminal due to instability of wireless network environments (S6), then it sends an error message to the wireless terminal (S7).

If the home server receives a control message for control of the operation of the camera from the user (S8), then it returns to step S3 to control the operation of the camera in response to the received control message.

For example, in the case where the user sends a control message for execution of the camera zoom-in function to the home server through the use of the wireless terminal in order to view a specific region of the building in more detail, the home server acquires a zoomed-in image from the camera and sends it to the wireless terminal.

That is, the user can more accurately check a desired internal image of the building through the wireless terminal by sending a control message for the camera zoom-in/zoom-out function or pan function to the home server.

In particular, at the moment that the security device senses entrance/exit of an outsider into/from the building, the home server sends an internal image of the building to the wireless terminal, thereby enabling the user to monitor the internal situation of the building in real time.

Moreover, in a different manner from the conventional system wherein the user has to check the internal image of the building using a separate reproduction device, the user can check the internal image through the wireless terminal from the remote place, so that he/she can save expenses for the separate reproduction device.

Furthermore, provided that the present home network system includes a separate memory, an image captured by the camera will be able to be stored in the memory so that it can be utilized according to the user's requirement in future.

Next, a description will be given of the operation of the home network system of the present invention in the case where the user checks the state of his/her child or pet in the home from a remote place or controls the security device from the remote place, with reference to FIG. 4.

First, the user generates a control message for control of the operation of the security device or camera through the wireless terminal and sends the generated control message to the home server.

The home server receives the control message for the security device or camera control (S11) and generates a control command for the security device or camera control in response to the received control message (S12).

If the control command generated by the home server is a security device control command (S13), the security device is on/off-controlled (S14).

If the control command generated by the home server is a camera control command (S13), the camera captures an internal image of the building (S15) and sends the captured image to the wireless terminal through the home server (S16).

At this time, if the home server fails to send the image to the wireless terminal due to instability of wireless network environments, then it sends an error message to the wireless terminal.

Meanwhile, the remote user may input a camera pan control or zoom-in/zoom-out control message through the wireless terminal in order to more accurately check the internal situation of the building. In this case, the home server generates a control command corresponding to the inputted control message.

As apparent from the above description, the present invention provides a wireless terminal-interoperable home network system and a method for controlling the same, wherein a user can access a home server in a building from a remote place outside of the building using a general wireless terminal without separate access to the Internet or PSTN to receive an internal image of the building from the home server, resulting in an increase in convenience of use.

Furthermore, the user can check the internal situation of the building in real time at a desired time, so that he/she can conduct safety supervision of his/her child or pet left alone in the building.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No. 10-2004-0012576, filed on Feb. 25, 2004, the contents of which are herein expressly incorporated by reference in its entirety.

What is claimed is:

1. A wireless terminal-interoperable network system, comprising:
   a security device installed at a building that generates an alarm signal upon sensing one of an entrance into and an exit from the building by a person;
   a camera that captures an internal image of the building; and
   a server connected with said security device, at least one home appliance and said camera via an internal network of the building, the server controlling operations of said security device, said at least one home appliance and said camera in response to a control message transmitted from a wireless terminal connected to a wireless communication network, said server transmitting the image captured by said camera and the alarm signal generated by said security device to said wireless terminal over said wireless communication network,
   wherein said server comprises:
      a wireless communication module that performs wireless communication with said wireless terminal over the wireless communication network;
      a controller that generates a control command to control the operation of at least one of said security device, said at least one home appliance and said camera in response to the control message from said wireless terminal, and that transmits an alarm signal from said security device and the image captured by said camera to said wireless terminal through said wireless communication module, and
      a memory that stores product information of said at least one home appliance and the image captured by said camera.

2. The wireless terminal-interoperable network system according to claim 1, wherein said wireless terminal comprises:
   a wireless communication module connected to the wireless communication network that transmits and receives data over the wireless communication network;
   an input unit that receives input to control operations of at least one of said security device, said at least one home appliance and said camera;
   a display that displays the image captured by said camera; and
   a microcomputer that generates the control message based on the input received by said input unit, receives the image data from said server through said wireless communication module, and performs a data conversion process on the received image data so that it can be displayed on said display.

3. The wireless terminal-interoperable network system according to claim 1, wherein said security device comprises:
   a sensor that senses the one of the entrance into and the exit from the building;
   a microcomputer that generates the alarm signal when said sensor senses one of the entrance and the exit; and
   a communication module that transmits the alarm signal from said microcomputer to said server, receives a control command from said server, and transfers the received control command to said microcomputer.

4. The wireless terminal-interoperable network system according to claim 3, wherein said sensor is an infrared sensor that checks a positional variation of an indoor heat source using infrared rays to sense movement of a person.

5. The wireless terminal-interoperable network system according to claim 1, further comprising:
   a driver coupled with said camera that controls the camera to perform one of a pan function and a zoom function in response to a control command from said server.

6. The wireless terminal-interoperable network system according to claim 5, wherein said camera comprises:

a memory that stores the captured image; and a communication module that transmits the captured image stored in said memory to said server and receives a control command to control the operation of said camera from said server.

7. The wireless terminal-interoperable network system according to claim 1, wherein said controller comprises:

a control command generator that generates the control command to control the operation of at least one of said security device, said at least one home appliance and said camera in response to the control message from said wireless terminal; and a transmission control module that performs a data conversion process on the alarm signal from said one of said security device and the image captured by said camera so that it can be transmitted to said wireless terminal.

8. The wireless terminal-interoperable network system according to claim 1, wherein said server further comprises:

a network module that at least one of transmits data to and receives data from at least one of said security device, said at least one home appliance and said camera over the internal network.

9. The wireless terminal-interoperable network system according to claim 8, wherein said network module comprises:

a wireless modem that transmits and receives data using radio frequency (RF) communication.

10. The wireless terminal-interoperable network system according to claim 8, wherein said network module comprises:

a power line modem that transmits and receives data using power line communication.

* * * * *